United States Patent [19]

Zaidi et al.

[11] Patent Number: 5,396,634
[45] Date of Patent: Mar. 7, 1995

[54] METHOD AND APPARATUS FOR INCREASING THE DECODING SPEED OF A MICROPROCESSOR

[75] Inventors: Syed A. A. Zaidi, Santa Clara; Bharat Zaveri, San Jose; Nimish Modi, Sunnyvale, all of Calif.

[73] Assignee: Intel Corporation, Santa Clara, Calif.

[21] Appl. No.: 954,749

[22] Filed: Sep. 30, 1992

[51] Int. Cl.6 .......................... G06F 9/24; G06F 9/30; G06F 9/34; G06F 9/38
[52] U.S. Cl. .................................. 395/800; 364/228.8; 364/228.7; 364/229.5; 364/230.6; 364/231.8; 364/232.21; 364/260.6; 364/260.7; 364/260.9; 364/262.4; 364/263.3; 364/262.81; 364/DIG. 1; 364/DIG. 2; 395/375
[58] Field of Search ............... 395/800, 375, 500, 550, 395/725, 775, 575, 400, 425, 325, 250, 275; 364/DIG. 1, DIG. 2

[56] References Cited

U.S. PATENT DOCUMENTS

5,136,696  8/1992  Beckwith et al. ............... 395/375
5,155,817 10/1992  Kishigami et al. .............. 395/375
5,222,244  6/1993  Carbine et al. .................. 395/800

Primary Examiner—Alyssa H. Bowler
Assistant Examiner—Daniel H. Pan
Attorney, Agent, or Firm—Blakely, Sokoloff, Taylor & Zafman

[57] ABSTRACT

Apparatus for increasing the decoding speed of a microprocessor. The apparatus includes a first decoder for decoding macroinstructions. The first decoder includes apparatus for generating a single initial microinstruction vector from simple macroinstructions and from complex macroinstructions having a beginning microinstruction equivalent to a microinstruction for a simple macroinstruction. The first decoder also includes apparatus for indicating a beginning address for generating any remaining microinstruction vectors for a complex macroinstruction decoded by the first decoder. The apparatus for increasing the decoding speed of a microprocessor also includes apparatus, coupled to the first decoder, for generating any remaining microinstruction vectors for complex macroinstructions decoded by the first decoder. The apparatus for generating any remaining microinstruction vectors includes apparatus for responding to the apparatus for indicating a beginning address.

3 Claims, 5 Drawing Sheets

METHOD AND APPARATUS FOR INCREASING THE DECODING SPEED OF A MICROPROCESSOR

BACKGROUND OF THE INVENTION

1. Field of the Invention

This invention relates to microprocessors and, more particularly, to apparatus for selecting instructions to be executed in a processing channel of a high speed microprocessor.

2. History Of The Prior Art

Computer designers are constantly searching for ways to cause computers to run programs faster so that they may handle more and more information more rapidly. One way in which this may be accomplished is by causing any processor used in a computer to process its instructions more rapidly. This is especially true when the processor involved is the central processor which controls the overall operation of the computer system.

The typical computer processor handles instructions in sequence. That is, a first instruction is retrieved, decoded, and executed. Then the next instruction in sequence is handled in a similar manner. Thus, instruction one must be processed or at least begun before instruction two can start.

One way in which the speed of computers is increased is by pipelining instructions. Instead of running each instruction until it is completed and then commencing the next instruction, an instruction is divided into stages which are carried out by different portions of the processor. Then, the stages of sequential instructions are overlapped so that, in general, no portion of the processor lies idle while any particular stage of an instruction is being carried out. Optimally, the processors are designed to pipeline instructions so that each stage of each instruction may be handled in one clock period. The typical stages of a pipelined instruction include a stage in which an instruction is fetched from wherever it is stored, one in which it is decoded, a stage in which the instruction is executed, and a final stage in which the results of the execution are written back to storage for later use. The different portions of the processor carry out each of the stages in the pipeline on sequential instructions during each clock period.

In a CISC type processor, many of the instruction being processed are high level instructions called macroinstructions which are themselves constructed of a series of microinstructions. In general, a microinstruction is an instruction which the processor of a computer is capable of handling in one operation. Thus, a shift or an add operation may be carried out by a macroinstruction which includes only a single microinstruction (referred to hereinafter as a simple macroinstruction) while a divide operation requires a macroinstruction consisting of many microinstructions (referred to hereinafter as a complex macroinstruction). The same processing sequence described above typically occurs for each of the microinstructions which are a part of a complex macroinstruction. That is, the individual microinstructions are obtained, decoded, and executed in the order in which they are received by the units of the microprocessor. In fact, because of the format of the instructions, it is necessary that the microinstructions be handled in this manner.

In order to handle the processing of the macroinstructions in typical prior art CISC computer processors, each of the macroinstructions is transferred to a decoder unit. The decoder unit decodes each macroinstruction and generates signals which select microcode stored in a local read only memory to produce the individual microcoded instructions (microinstruction vectors) which make up the macroinstruction. The microinstructions generated by the read only memory are furnished individually in sequence to the circuitry of the processor. In this way, a relatively complex instruction involving many sequential single microinstructions may be represented by an macroinstruction which consumes much less register space than would all of the individual microinstructions of which it is comprised.

Because the individual microinstruction vectors of a longer macroinstruction must be executed in sequential order, accelerating the decoding of the higher level macroinstructions has been very difficult.

SUMMARY OF THE INVENTION

It is, therefore, an object of the present invention to accelerate the decoding of instructions in a CISC computer.

It is another more specific object of the present invention to provide circuitry for handling the decoding of higher level macroinstructions in a CISC computer more rapidly than was previously possible.

These and other objects of the present invention are realized in an apparatus for increasing the decoding speed of a microprocessor comprising a first decoder for decoding macroinstructions, the first decoder including apparatus for generating a single initial microinstruction vector from simple macroinstructions and from macroinstructions having a beginning microinstruction vector equivalent to a microinstruction vector for a simple macroinstruction; apparatus for generating any remaining microinstruction vectors for complex macroinstructions decoded by the first decoder; apparatus for directing all macroinstructions to be decoded to the first decoder; apparatus in the first decoder for indicating to the apparatus for generating any remaining microinstruction vectors the remaining microinstruction vectors to be generated from any decoded complex macroinstruction; and means in the apparatus for generating any remaining microinstruction vectors for responding to the apparatus in the first decoder for indicating to the apparatus for generating any remaining microinstruction vectors the remaining microinstruction vectors to be generated from any decoded complex macroinstruction.

These and other objects and features of the invention will be better understood by reference to the detailed description which follows taken together with the drawings in which like elements are referred to by like designations throughout the several views.

BRIEF DESCRIPTION OF THE DRAWINGS

FIG. 3(a), (b) and (c) are state diagrams illustrating the operation of portions of the circuit of FIG. 2.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to a method and to apparatus for operating a computer in processing electrical or other (e.g. mechanical, chemical) physical signals to generate other desired physical signals.

DETAILED DESCRIPTION OF THE INVENTION

Figures 1, 2:
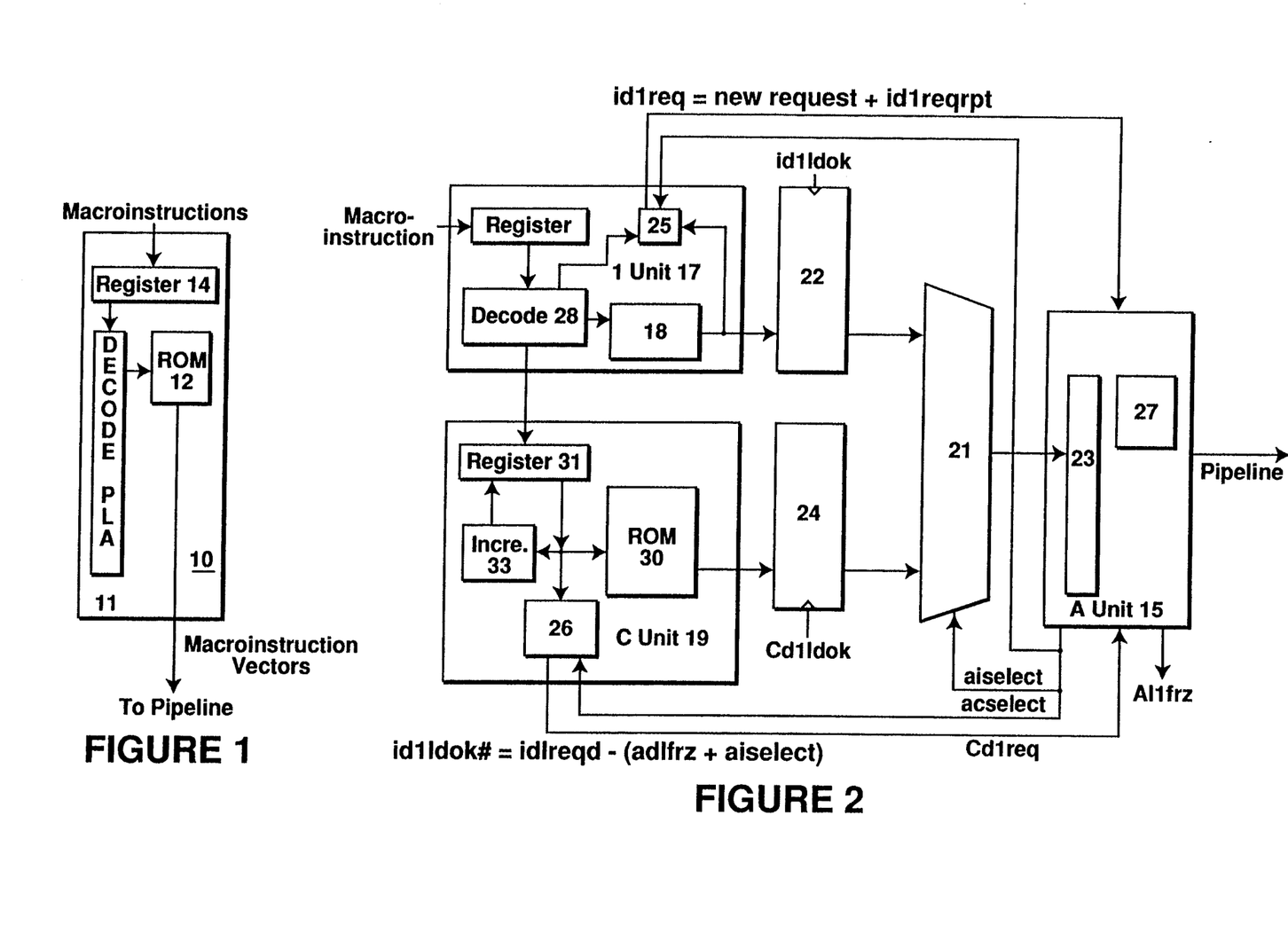
FIG. 1 is a block diagram illustrating decoding circuitry utilized in prior art CISC computer systems.
FIG. 2 is a block diagram illustrating decoding circuitry utilized in accordance with the present invention.

Referring now to FIG. 1, there is illustrated a block diagram of circuitry constructed in accordance with the prior art for processing the instruction vectors utilized by a CISC computer. The circuit 10 illustrated is a portion of a processor which manipulates the instructions and data in a computer system. The circuit 10 is a decoder unit which receives each instruction in a pipeline of instructions. The instructions are provided by the particular process being run on the computer and are typically referred to as macroinstructions. Each of the macroinstructions may include one or more single microinstruction vectors for causing one or more operations which the computer is to accomplish. A macroinstruction which calls for only a single machine operation (a simple macroinstruction) is stored in a register 14, decoded by a decoder programmable logic array 11 (PLA), and generates signals which select a single microinstruction vector from the microcode ROM 12. The microinstruction vector is then transferred to the next stage of the pipeline, typically the execution stage.

If, on the other hand, the macroinstruction is a complex macroinstruction which itself represents a number of sequential microinstructions, then the circuit 10 typically stores the instruction in a register 14, decodes the instruction using the decode PLA 11, generates sequential signals to cause the microcode ROM 12 to issue the individual microinstruction vectors one by one, and sends those vectors on sequentially to the next unit in the processing pipeline.

Figure 5:
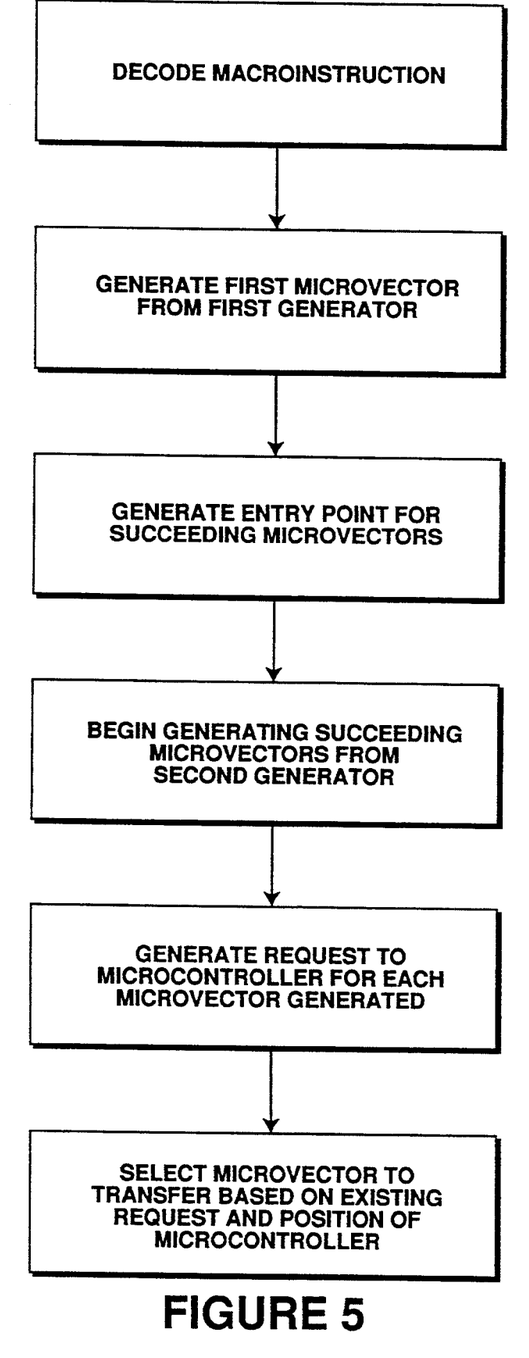
FIG. 5 illustrates a process in accordance with the invention.

In order to speed processing, a microcontroller arrangement now has been devised which is used to sequence the instruction data through the processing pipeline more rapidly. An arrangement in accordance with the invention including a microcontroller 15 is illustrated in FIG. 2. A process in accordance with the invention is described in FIG. 5. The microcontroller 15 controls the transfers of microinstruction vectors to the pipeline and the halts (freezes) in the processing pipeline necessary to allow the pipeline to function correctly. The microcontroller 15 selects the next microinstruction vector to be processed by the pipeline. In the arrangement, the generation of the microcode vectors in the decoding operations has been distributed between an initial decoder 17 and a second microcode generator 19. The initial decoder 17 is equipped with a decode circuit 28 and a minimal microcode generation unit 18. In the preferred embodiment of the invention, both the decode circuit 28 and the microcode generation unit 18 are programmed logic arrays (PLA) constructed in a manner well known to the prior art; the unit 18 might also be constructed as a read only memory in a particular arrangement. The microcode generation unit 18 is adapted to handle only the generation of microinstructions from macroinstructions which include only a single machine operation, that is, from simple macroinstructions. In general, simple macroinstructions include all common moves, operations by the arithmetic and logic unit, increment/decrement operations, push/pop operations, and a few other instructions. If, however, the first microinstruction of a complex macroinstruction is basically the same as the microinstruction of a simple macroinstruction for which the microcode generation unit 18 of the initial decoder 17 contains microcode, then that first microinstruction is generated by the microcode generation unit 18 in response to decoding by the decoder 17.

In order to accomplish this, the decode circuit 28 provides a value to the microcode generation unit 18 to select the first microinstruction vector and provides an entry point value to the second microcode generator 19 which indicates the address in a microcode read only memory of the second microcode generator 19 at which the microcode vector generation is to begin. The entry point value is an address which marks the point at which the second microcode generator 19 is to begin generating the microinstruction vectors which make up the remainder of the complex macroinstruction.

The second microcode generator 19 includes a read only memory (ROM) 30 storing all of the microcode vectors necessary to the decoding of complex multi-component macroinstructions. In operation, a complex macroinstruction is transferred to the decoder 17, the macroinstruction is decoded by the decode circuit 28 and, if possible, the first microcode vector is generated by the microcode generation unit 18. If the beginning microvector of a complex macroinstruction cannot be generated by microcode generation unit 18, a no operation (NOP) value is instead generated. At the same time, the decode circuit 28 generates a signal defining the entry point for the remainder of the macroinstruction and directs that signal to the microcode generator 19. In the preferred embodiment of the invention, the microcode generator 19 uses the entry point as a first address to a lookup table in ROM at which the addresses of the microvectors to be generated for the macroinstruction are recorded. The generator 19 stores the entry point address in a register 31. The generator 19 increments the entry point address in the register as each microcode vector is generated by the ROM 30. Thus, the microcode generator 19 begins generating microcode vectors from the address data obtained at the entry point address in ROM and produces those microcode vectors (usually) sequentially to complete the macroinstruction. As each microcode vector is taken by the pipeline, the next in sequence is provided until the remaining microcode vectors have all been furnished as indicated by an end of instruction field in the last microvector.

The microcontroller 15 is able to accept microinstruction vectors either from the initial decoder 17 or from the microcode generator 19. Since both the initial decoder 17 and the microcode generator 19 may be generating microcode vectors during the same clock period, the time required for processing macroinstructions may be reduced. Moreover, since the initial decoder 17 also generates the first microinstruction vector of any complex macroinstruction which the circuit 18 is able to generate, that initial microinstruction vector need not pass through the microcode generator 19 but may be immediately passed directly to the microcontroller 15 while the remainder of the macroinstruction is being processed by the generator 19. This also speeds the operation of the computer.

When the decoder 17 has decoded a valid macroinstruction and generated either a microinstruction vector representing the single machine operation of that macroinstruction or a first microinstruction vector of a complex macroinstruction, it places the decoded microinstruction vector in a transparent latch 22 and sends a request signal Id1req to the microcontroller 15 indicating that the instruction is ready for transfer to the pipeline. Each microinstruction includes an end of instruction field. If the microinstruction vector represents the single machine operation of a simple macroinstruction, then the end of instruction field indicates that this is the last microvector of the instruction. If the microinstruction vector represents the first machine operation of a complex macroinstruction, then the end of instruction field indicates this is not the last microvector of the instruction. In a similar manner, when the microcode generator 19 has generated a first microinstruction vector of a valid macroinstruction, it places the decoded microinstruction vector in a transparent latch 24 and sends a request signal Cd1req to the microcontroller 15 indicating that the instruction is ready for transfer. The end of instruction field of this microinstruction also indicates whether it is the end of instruction microvector or not.

The microcontroller 15 reviews the request signals Id1req and Cd1req furnished to it by the two decoders 17 and 19 and decides which information to accept. If the microcontroller 15 is looking at the initial decoder 17 (as indicated by the assertion of the signal Aiselect) when a request is received from an initial decoder 17, a multiplexor 21 transfers the decoded single microinstruction vector generated by the initial decoder 17 to the microcontroller 15. The single microinstruction vector from the initial decoder 17 is held in the transparent latch 22 and is transferred by an enable signal id1lok which, in general, indicates that a valid decoded instruction exists in the latch 22 and that the pipeline is not frozen. However, if the pipeline is frozen because the previous instruction from the initial decoder 17 has not yet been accepted by the pipeline for some reason, then the microcontroller 15 will refuse the instruction; and the initial decoder 17 will continue to assert the request on the next clock. In such a case the previous instruction which is held in a latch 23 of the microcontroller 15 remains in the latch 23, and the id1lok signal is deasserted. If, on the next clock, the freeze of the pipeline has terminated, then the request from the initial decoder 17 is honored; and the initial microinstruction available at the initial decoder 17 is processed. If the freeze continues, then the microcontroller 15 continues to refuse the request; and the initial decoder 17 continues to assert the request on the next clock.

Similarly, if the microcontroller 15 is pointing to the microcode generator 19 (as indicated by the signal acselect enabling the multiplexor 21) and a request is received from the initial decoder 17, the microcontroller 15 will ignore the request; and the initial decoder 17 will continue to assert the request signal.

If the microcontroller 15 is pointing to the microcode generator 19, it will continue to handle the instructions from the microcode generator 19 until all of the microinstruction vectors for the entire macroinstruction have been generated and processed and the end of instruction signal is received. The microinstruction vectors generated by the generator 19 are transferred by the transparent latch 24 which is enabled when a valid microinstruction vector exists in the latch 24 and the pipeline is not frozen. When all of the individual microinstruction vectors of the macroinstruction have been transferred by the microcontroller 15 as is indicated by the end of instruction field of the microinstruction, the microcontroller 15 switches its pointer to the initial decoder 17.

Figures 3A, 3B, 3C:
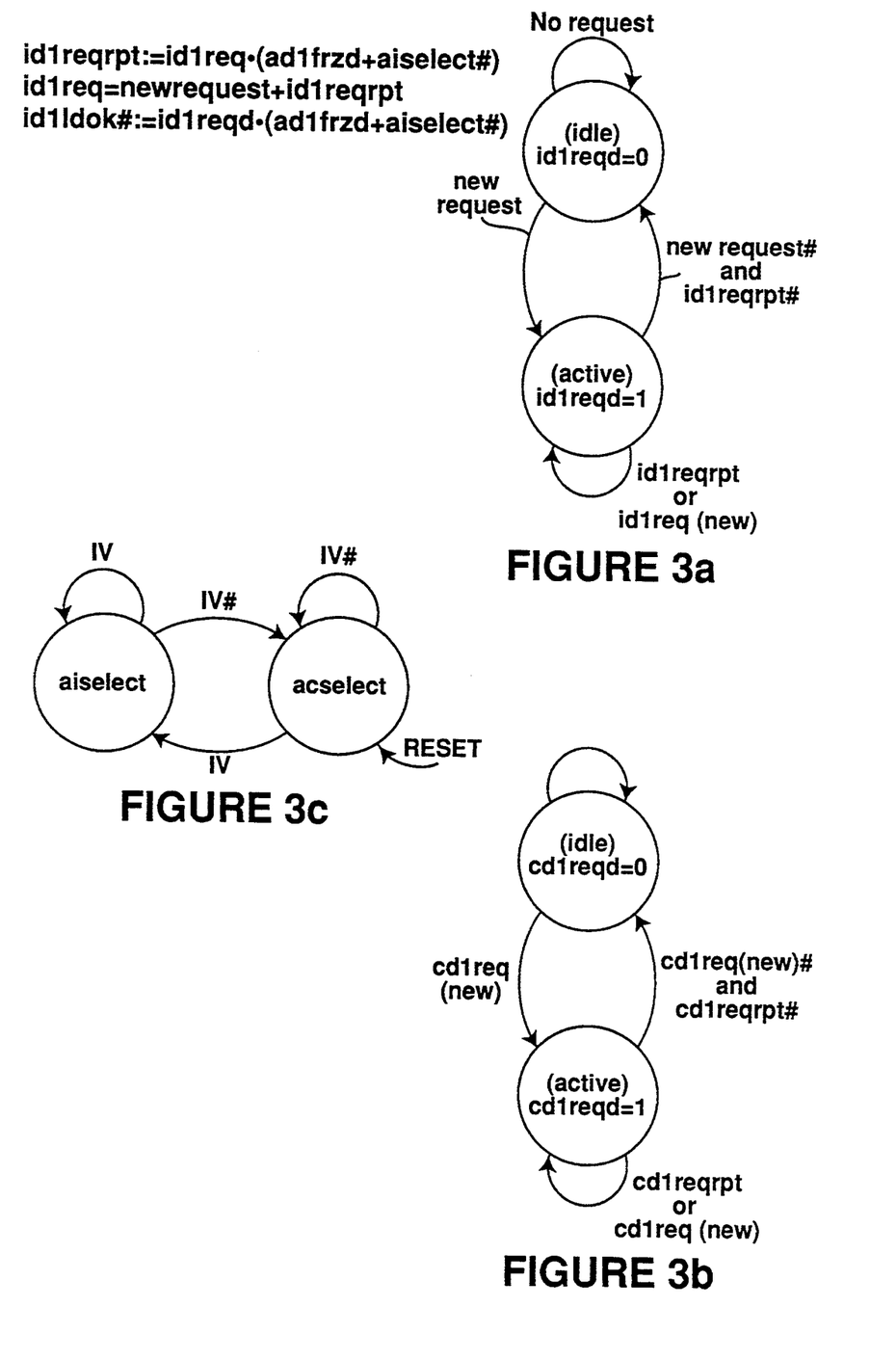

FIG. 3(c) is a state diagram illustrating the operation of a state machine 27 in the microcontroller 15 by which the signals aiselect and acselect are generated so that the unit from which to accept a microcode vector is decided. A one signal in the end of instruction field of a microvector indicates that the microvector is the last microvector of an instruction while a zero indicates the microvector is not the last microvector of an instruction. On power up, the microcontroller 19 points toward the microcode generator 19. If a complex macroinstruction is received, all except the last of the microvectors furnished by the initial decoder 17 and by the microcode generator 19 will contain a zero in the end of instruction field. The microcontroller 15 seeing these zero values will continue to point to the microcode generator 19 and accept microvectors from that unit until the microvector contains an end of instruction signal. When the microcontroller 15 receives a one indicating the microvector is the last vector in the instruction, the microcontroller shifts to receive microvectors from the initial decoder 17. Thus, when a simple macroinstruction is decoded by the initial decoder 17, it will contain an end of instruction signal; and the microcontroller 15 will continue to point to the initial decoder 17 for the next macroinstruction.

If the microcontroller 15 is pointing to the microcode generator 19 and a request is received from the microcode generator 19 to process an instruction and if the microcode generator 19 is in the middle of generating the microinstruction vectors for a complex macroinstruction, the microcontroller 15 will see no end of field indication and will accept the next microinstruction vector from the microcode generator 19. If the microcontroller 15 is pointing to the microcode generator 19 and a request is received from the initial decoder 17 to process an instruction, the microcontroller 15 will refuse the instruction from the initial decoder 17; and the initial decoder 17 will reassert the request on next clock.

FIG. 3(a) is a state diagram illustrating the conditions of a state machine 25 in the decoder 17 which generates the request signal id1req to the microcontroller 15. FIG. 3(b) is a similar state diagram illustrating the conditions of a state machine 26 in the generator 19 which generates the cd1req to the microcontroller 15. As may be seen, the state machine 25 initially resides in an idle state. In this state, no signal is generated to request transfer of a single microinstruction vector to the pipeline. The state machine 25 will remain in this condition until one clock after a valid single microinstruction decode occurs and the microcontroller 15 is pointing to the decoder 17. The microinstruction vector may be the result of the decoding of the single microinstruction vector of a simple macroinstruction or the result of the generation of a first microinstruction vector of a complex macroinstruction which the decoder 17 is equipped to generate. When a valid single microinstruction vector is generated in the decoder 17, the state machine 25 moves to an active state in which the request signal id1req is generated. If, after one clock of the signal id1req, the microcontroller 15 is not generating the signal aiselect (not pointing to the decoder 17) or if a pipeline freeze occurs in this active state, this causes the generation of a repeat request signal id1reqrpt. The state machine 25 remains in this active state generating a signal indicating that it has a valid microinstruction vector to transfer. In the case of a freeze, the request is repeated; and the state machine 25 remains in this state until the freeze is cleared and the microinstruction vector has been transferred. Once the microinstruction vector has been transferred and if there is no new request, the machine 25 moves back to the idle state.

In a similar manner, the state machine 26 remains in an idle state so long as the microcontroller 15 generates a signal aiselect designating the decoder 17 as the unit from which a microinstruction is to be received. One clock after the aiselect signal is removed, the state machine 26 may move to the active state when a single microinstruction of a macroinstruction has been decoded. In this condition, a request signal cd1req is generated to inform the microcontroller 15 that a valid microinstruction vector is ready to be transferred by the microcode generator 19. The state machine 26 remains in the active state as long as a new request signal appears or a repeat request signal cd1reqrpt caused by a pipeline freeze is generated. The machine 26 returns to the idle state if there is no new request or no repeat request signal.

Figure 4A:
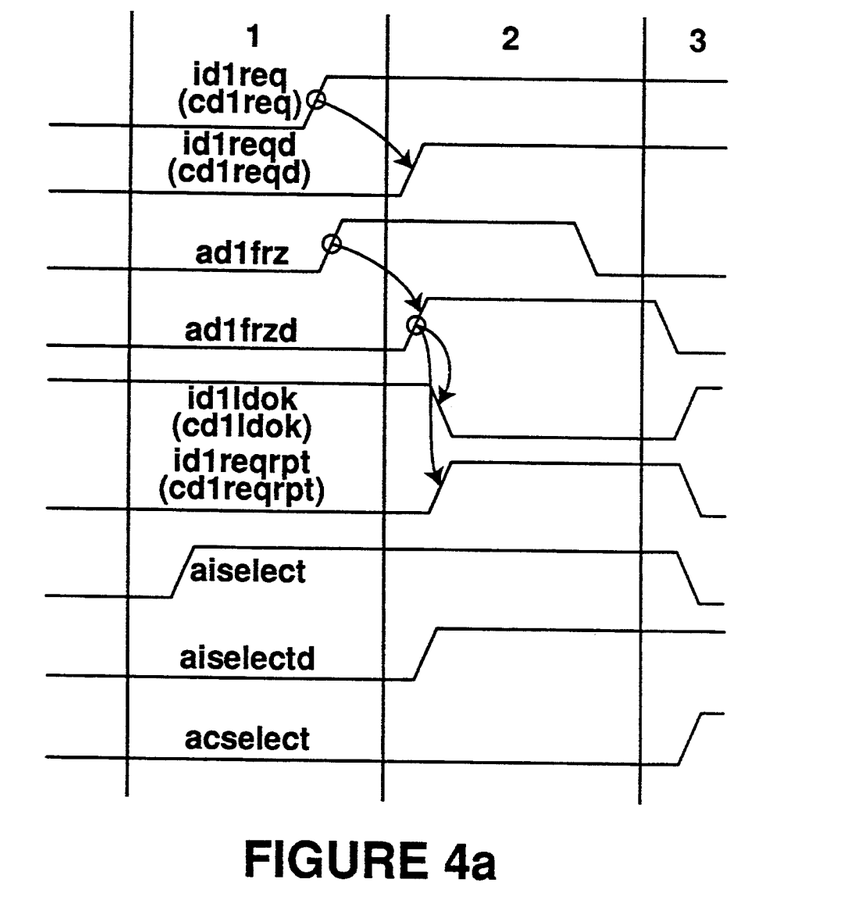
FIG. 4(a) and (b) are timing diagrams useful in understanding the operation of the circuit of FIG. 2.

FIG. 4 is a timing diagram illustrating the operation of the circuit of FIG. 2. In the typical condition of the circuit with no request from either the decoder 17 or the generator 19, the microcontroller 15 asserts the signal aiselect which points to the decoder 17 by selecting the output of the latch 22 from that unit at the multiplexor 21. If a valid request signal id1req appears, the signal id1reqd (a one clock delayed signal) is generated; and the microinstruction vector is transferred to the microcontroller 15. If, however, a freeze occurs, the freeze signal ad1frz signals causes the generation of both a repeat signal id1reqrpt and the deassertion of the signal id1lok after a delay of one clock (shown by the ad1frzd signal) which normally allows the transfer of the microinstruction vector to the output of the transparent latch 22. Thus, a freeze causes the request to be repeated by the decoder 17 until the pipeline freeze is removed.

As may be seen by the notation accompanying FIG. 3(b), the requests from the generator 19 function in a similar manner except that the microcontroller 15 selects the generator 19 by a signal acselect (aiselect#) and the request signal cd1req from the state machine. As may be seen when the select signal points to the decoder 17, the cd1req signal is ignored.

Figure 4B:
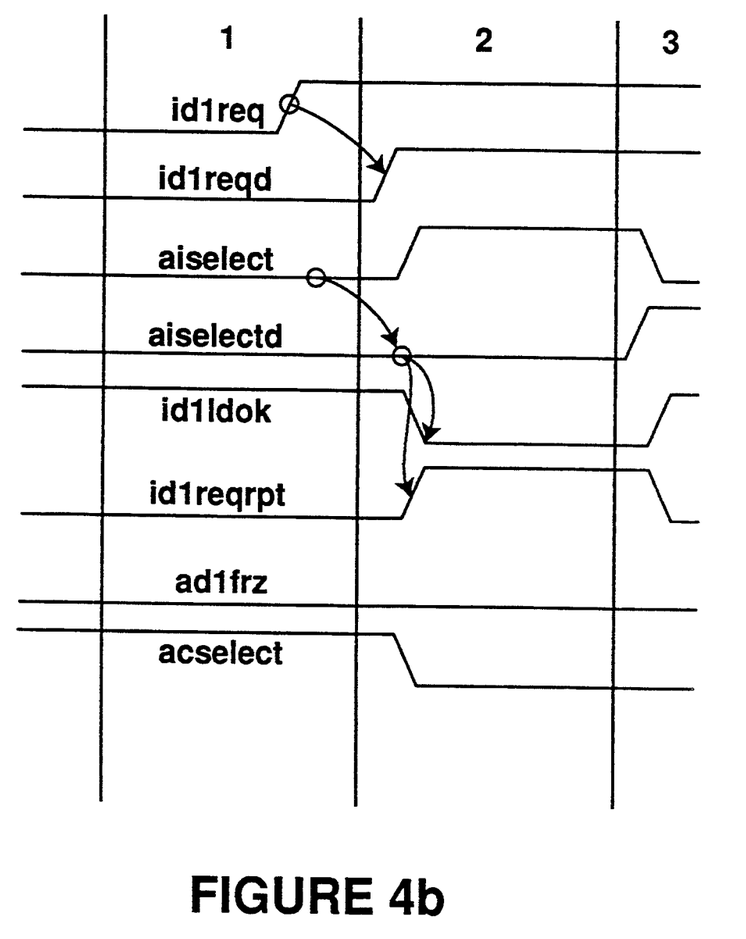

In FIG. 4(b) a second illustration is given to demonstrate the circumstance in which the microcontroller 15 selects the generator 19 by a signal acselect and a id1req signal occurs. As may be seen, the deasserting of the aiselect signal causes the id1lok signal to be deasserted and the id1reqrpt signal to be asserted. When the signal aiselect is later asserted, the request from the decoder 17 is honored and the microinstruction vector is transferred to the microcontroller 15.

Thus, it will be seen that the present invention in fact causes a very rapid sequencing of decoded instructions provided by the decoder 17 and generator 19 so that processing may be more rapidly handled than was true with prior art arrangements.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. Apparatus for increasing a decoding speed of a microprocessor comprising:
   a first decoder for decoding macroinstructions, the first decoder including means for generating a single initial microinstruction vector from simple macroinstructions and from complex macroinstructions having a beginning microinstruction equivalent to a microinstruction vector for a simple macroinstruction and including means for generating a signal indicating that the first decoder has a microinstruction to transfer;
   means, coupled to the first decoder, for generating any remaining microinstruction vectors for complex macroinstructions decoded by the first decoder;
   means for directing all macroinstructions to be decoded to the first decoder;
   means, in the first decoder, for indicating to the means for generating any remaining microinstruction vectors a beginning address for generating any remaining microinstruction vectors for a complex macroinstruction decoded by the first decoder;
   means, in the means for generating any remaining microinstruction vectors, for responding to the means in the first decoder for indicating a beginning address for generating any remaining microinstruction vectors for a complex macroinstruction decoded by the first decoder;
   means, in the means for generating any remaining microinstruction vectors, for generating a signal indicating that the means for generating any remaining microinstruction vectors has a microinstruction vector to transfer;
   means for sequencing microinstruction vectors from the first decoder and from the means for generating any remaining microinstruction vectors to remaining stages of the microprocessor, wherein said means for sequencing microinstruction vectors is coupled to said remaining stages of the microprocessor, to said first decoder, and to said means for generating any remaining microinstruction vectors, said means for sequencing microinstruction vectors comprising:

means for multiplexing;

means for disabling the means for multiplexing in response to the inability of remaining stages to handle any microinstruction vector, wherein the means in the first decoder for generating a signal indicating that the first decoder has a microinstruction vector to transfer responds to a disabled multiplexing means by repeating any signal it is generating, and wherein the means in the means for generating any remaining microinstruction vectors for generating a signal indicating that the means for generating any remaining microinstruction vectors has a microinstruction vector to transfer responds to a disabled multiplexing means by repeating any signal it is generating;

means, in the means for sequencing microinstruction vectors, for pointing to either the first decoder or to the means for generating any remaining microinstruction vectors, the means in the means for sequencing microinstruction vectors for pointing to either the first decoder or to the means for generating any remaining microinstruction vectors further comprising:

means for pointing to the first decoder after any microinstruction vector which is a last vector of an instruction;

means for pointing to the means for generating any remaining microinstruction vectors after any microinstruction vector which is not a last vector of an instruction;

means, in the means for sequencing microinstruction vectors, for enabling the means for multiplexing to transfer a microinstruction vector from the first decoder when the first decoder has a microinstruction vector to transfer and the means for pointing points to the first decoder or from the means for generating any remaining microinstruction vectors when the means for generating any remaining microinstruction vectors has a microinstruction vector to transfer and the means for pointing points to the means for generating any remaining microinstruction vectors.

2. A method for increasing a decoding speed of a microprocessor comprising steps of:

decoding a macroinstruction;

generating a single initial microinstruction vector from a first generator for simple macroinstructions and for complex macroinstructions having a beginning microinstruction equivalent to a microinstruction vector for a simple macroinstruction;

simultaneously beginning the generating of any remaining microinstruction vectors for complex macroinstructions from a second generator;

sequencing microinstruction vectors from the first generator and from the second generator to remaining stages of the microprocessor, wherein the step of sequencing microinstruction vectors from the first generator and from the second generator to remaining stages of the microprocessor comprises steps of:

generating a signal indicating that the first generator has a microinstruction vector to transfer;

generating a signal indicating that the second generator has a microinstruction vector to transfer;

pointing to either the first generator or to the second generator, wherein the step of pointing to either the first generator or to the second generator comprises:

pointing to the first generator after any microinstruction vector which is a last vector of an instruction;

pointing to the second generator after any microinstruction vector which is not a last vector of an instruction; and selecting for transfer a microinstruction vector from the first generator when the first generator has a microinstruction vector to transfer and the first generator is pointed to or from the second generator when the second generator has a microinstruction vector to transfer and the second generator is pointed to.

3. Apparatus for increasing a decoding speed of a processor, the apparatus comprising:

a decode circuit coupled to receive a macroinstruction, the decode circuit for generating an initial value indicating a first microinstruction of the macroinstruction, and for generating an entry point value indicating any subsequent microinstruction of the macroinstruction;

a first microcode generator coupled to receive the initial value, the first microcode generator for generating only a first microinstruction vector for the first microinstruction if the macroinstruction is either a simple macroinstruction comprising the first microinstruction or a complex macroinstruction comprising several microinstructions of which the first microinstruction is an initial microinstruction that is equivalent to the simple macroinstruction;

a second microcode generator coupled to receive the entry point value, the second microcode generator for generating a second microinstruction vector in response to the entry point value; and a sequencing circuit coupled to receive the first microinstruction vector and the second microinstruction vector, the sequencing circuit for sequentially outputting the first microinstruction vector and the second microinstruction, the sequencing circuit comprising:

a first signal generator coupled to the decode circuit and the first microcode generator, the first signal generator for generating a first signal indicating that the first microcode generator has the first microinstruction vector to transfer, wherein the first signal is generated in response to the first microinstruction vector being generated;

a second signal generator coupled to the decode circuit and the second microcode generator, the second signal generator for generating a second signal indicating that the second microcode generator has the second microinstruction vector to transfer if the entry value is received from the decode circuit;

a multiplexer coupled to receive the first and second microinstruction vectors, the multiplexer for selectively outputting a one of the first and second microinstruction vectors in response to a control signal, wherein the multiplexer outputs the first microinstruction vector when the control signal is in a first state and the second microinstruction vector when the control signal is in a second state, the multiplexer being disabled when the control signal is in a third state;
a control signal generator coupled to the multiplexer and the first and second signal generators, the control signal generator for generating the control signal.

* * * * *

UNITED STATES PATENT AND TRADEMARK OFFICE
CERTIFICATE OF CORRECTION

PATENT NO.    : 5,396,634
DATED         : March 7, 1995
INVENTOR(S)   : Zaidi et al.

It is certified that error appears in the above-identified patent and that said Letters Patent is hereby corrected as shown below:

In column 9 at line 59 delete "generating" and insert --generation--

Signed and Sealed this

Fifth Day of November, 1996

Attest:

BRUCE LEHMAN

Attesting Officer

Commissioner of Patents and Trademarks